United States Patent [19]
Yamasaki et al.

[11] 3,722,273
[45] Mar. 27, 1973

[54] FLOW MEASURING APPARATUS

[75] Inventors: Hiroo Yamasaki; Yoshio Kurita, both of Tokyo, Japan

[73] Assignee: Yokogawa Electric Works, Ltd., Tokyo, Japan

[22] Filed: Jan. 22, 1971

[21] Appl. No.: 108,731

[30] Foreign Application Priority Data

Jan. 30, 1970 Japan ................... 45/8196

[52] U.S. Cl. .............................................. 73/194 B
[51] Int. Cl. ................................. G01f 1/00, G01p 5/00
[58] Field of Search ..................................... 73/194 B

[56] References Cited

UNITED STATES PATENTS

| 3,564,915 | 2/1971 | Tomota et al. | 73/194 |
| 3,279,251 | 10/1966 | Chanaud | 73/204 X |
| 3,559,482 | 2/1972 | Baker et al. | 73/204 |

OTHER PUBLICATIONS

Sharpsteen "Fluid Amplifier Measures Flow Velocity" in Control Engineering January 1966 pg. 103.

*Primary Examiner*—Richard C. Queisser
*Assistant Examiner*—Herbert Goldstein
*Attorney*—Bryan, Parmelee, Johnson & Bollinger

[57] ABSTRACT

Flow metering apparatus comprising an elongate cylindrical element mounted in the stream of flowing fluid to produce Karman's vortices, the element being formed on opposite sides thereof with openings leading into corresponding interior cavities coupled together within the element; pressure conduits connect from each of the interior cavities to a sealed pressure chamber outside of the stream of flowing fluid and containing a flow-responsive detecting device including an electrically-heated wire adapted to develop electrical pulses corresponding to the pressure pulses produced by the shedding of Karman's vortices.

6 Claims, 11 Drawing Figures

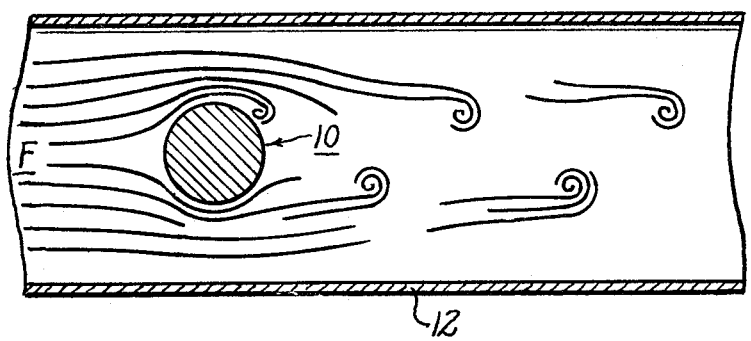
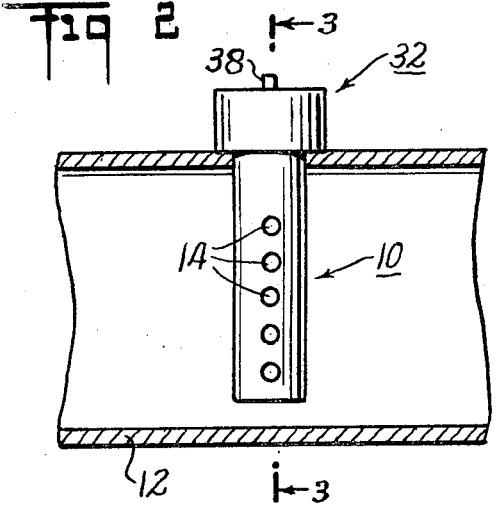
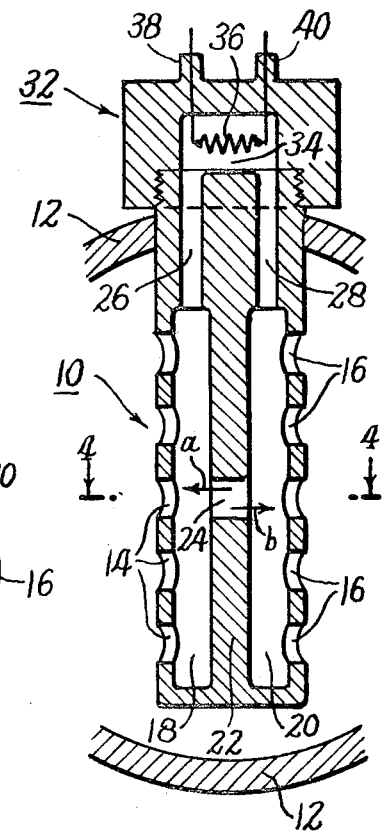
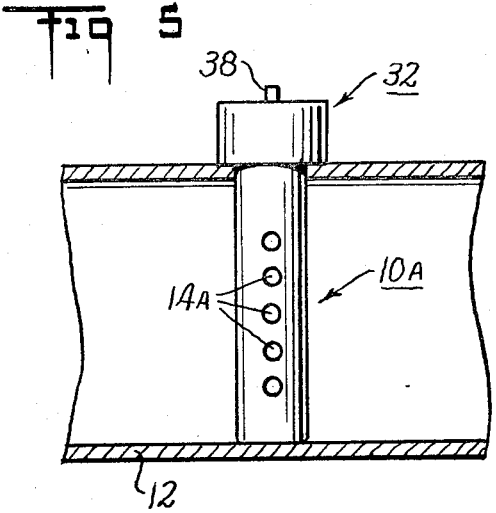

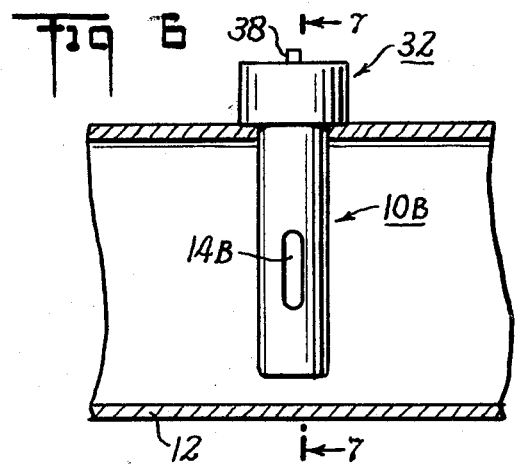
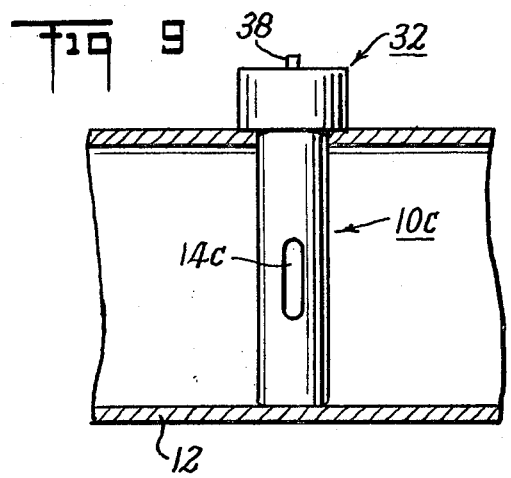
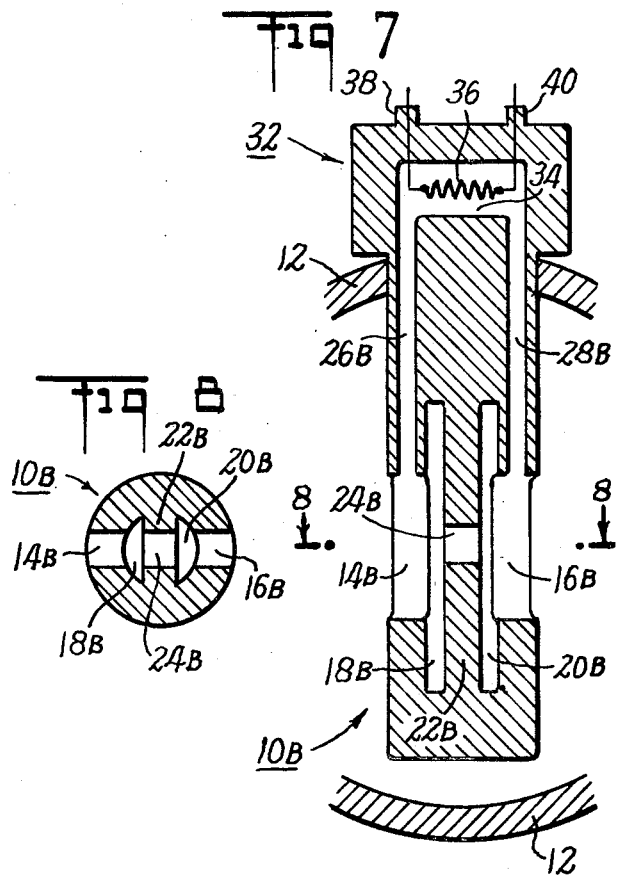
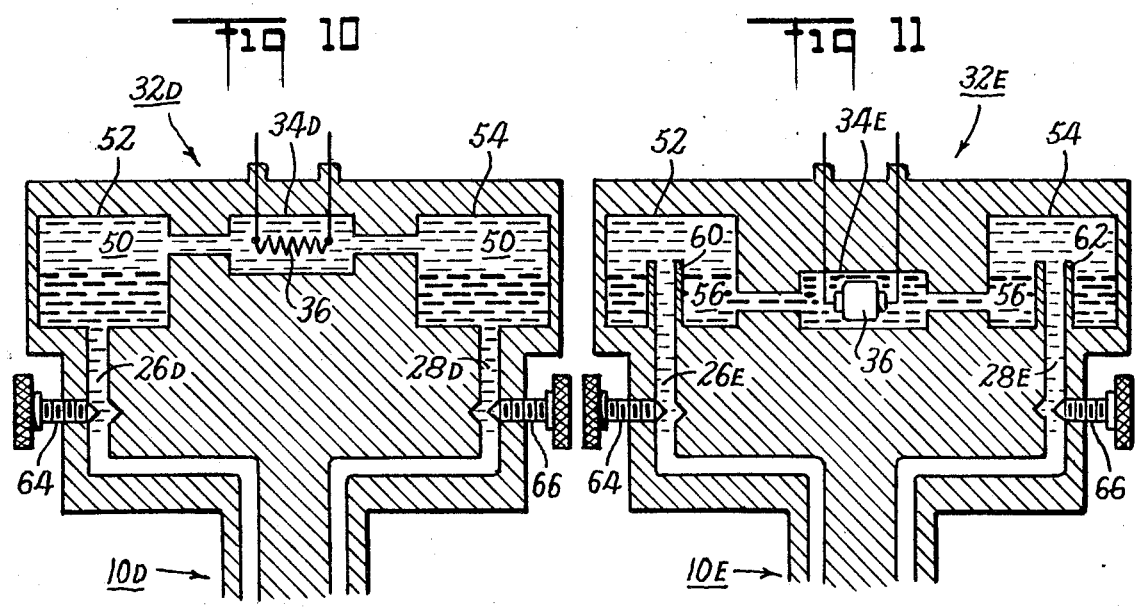

FLOW MEASURING APPARATUS

BACKGROUND OF THE INVENTION

1. Field of the Invention

This invention relates to flow metering apparatus of the type wherein a cylindrical object in a stream of flowing fluid produces a wake including a distinct pattern of vortices known as the Karman's vortex street. The vortices are shed from alternate sides of the object in a periodic manner. It has been found that there is a definite relationship between the frequency f of shedding of the vortices, the diameter D of the cylinder, and the velocity V of the stream, expressed by:

$$f = Khu. (V/D)$$

Accordingly, it is possible to determine the flow velocity $v$ by measuring the frequency $f$ of the generation of vortices.

2. Description of the Prior Art

Various arrangements have been proposed for producing signals responsive to the rate of development of Karman's vortices as described above. In one such arrangement shown on page 103 of the January, 1966, issue of Control Engineering, a fluidic flip-flop serves as the pressure detection device, and is located within the cylindrical element in the flowing stream to sense the pressure fluctuations directly. Sensing ports of the flip-flop open out into the flowing fluid adjacent the surface of the cylinder, such that the flip-flop state is alternated by the alternating formation of vortices at the surface.

In still another prior art arrangement, disclosed in copending application Ser. No. 760,604, filed Sept. 18, 1968, by Miaji Tomota, et al., the cylindrical element is formed with a transverse bore containing a detection device comprising a pressure-responsive diaphragm for sensing pressure fluctuations and for developing output signals responsive to the shedding of Karman's vortices. Various other internal pressure detection arrangements are disclosed in that co-pending application.

Such prior art apparatus of the general type referred to above has not been fully satisfactory for certain applications. For example, there have been some difficulties in maintaining the detection devices properly operative in flowing streams containing contaminants. Also, there have been problems with maintenance, particularly with regard to disassembly of the apparatus and replacement of portions thereof.

SUMMARY OF THE INVENTION

In a preferred embodiment of the invention to be described hereinbelow in detail, the cylindrical element inserted in the flowing stream is formed on opposing sides with holes leading to corresponding cavities within the element. To detect the pressure variations produced by the shedding of Karman's vortices, the cylindrical structure is formed internally with pressure conduits leading from the cavities to opposite ends of a chamber located outside the stream of flowing fluid. This chamber contains a flow-responsive detection device, for example in the form of an electrically-heated wire. The overall arrangement affords effective isolation between the detection device and the stream of flowing fluid, particularly so as to protect the detector from the contaminating effects of material carried in the flowing stream. The arrangement further is advantageous in accommodating ready disassembly of the equipment for maintenance or for replacement of individual parts.

Accordingly, it is a principal object of this invention to provide improved apparatus and techniques for sensing the shedding of Karman's vortices and thereby to measure the rate of fluid flow. It is a specific object of the invention to provide control apparatus which reduces the contaminating effects of the flowing fluid stream. Still another object of the invention is to provide flow measuring apparatus of the type described which is more suitable for commercial use.

Other objects, aspects and advantages of the invention will be pointed out in, or apparent from, the detailed description hereinbelow, considered together with the following drawings.

BRIEF DESCRIPTION OF THE DRAWINGS

FIG. 1 is a diagrammatic illustration of the mode of formation of Karman's vortices;

FIG. 2 is a vertical longitudinal section through a fluid flow pipe, showing one form of the cylindrical element in elevation;

FIG. 3 is a cross-section taken along line 3—3 of FIG. 2;

FIG. 4 is a horizontal detail section taken along line 4—4 of FIG. 3;

FIG. 5 is a view similar to FIG. 2, but showing a modified form of cylindrical element;

FIG. 6 is a view like FIG. 2, but of still another form of cylindrical element;

FIG. 7 is a cross-section taken along line 7—7 of FIG. 6;

FIG. 8 is a horizontal detail section taken along line 8—8 of FIG. 7;

FIG. 9 is a view like FIG. 6, but showing a modified version of the cylindrical element;

FIG. 10 is a vertical section showing a modified form of sensing module adapted to be coupled to any of the cylindrical elements disclosed; and FIG. 11 is a vertical section showing a further modified version of a sensing module.

Referring first to FIG. 1, it is known that the insertion of a cylindrical element 10 in a stream of flowing fluid F results in the periodic formation and shedding of vortices from alternate sides of the element. Such element typically is secured in place by attachment to the wall of the pipe 12, as shown in FIG. 2.

Referring now also to FIGS. 3 and 4, the element 10 is formed on opposite sides thereof with respective sets of holes 14 and 16. Each set of holes is arranged in a straight line parallel to the axis of the cylinder, and communicates with a corresponding interior cavity 18, 20. These cavities are separated by a central partition 22 having an opening 24 serving as a passageway to accommodate the flow of fluid therebetween.

When the vortices are shed from element 10, corresponding pressure fluctuations are produced next to the adjacent set of holes 14 and 16. Since the vortices are shed alternately from the opposite sides of the element, the pressures within the cavities 18, 20 also will fluctuate in an alternating fashion. These pressure fluctuations cause fluid to be displaced (i.e. to flow)

through the opening 24 in an alternating fashion, first in one direction and then in a reverse direction, as indicated by the arrows *a* and *b*. The rate of pressure alternation is proportional to the rate of generation of vortices, and this in turn is proportional to the rate of fluid flow through the pipe.

To produce an external indication of the rate of pressure alternation, the two cavities 18, 20 are coupled by respective pressure conduits 26, 28 to an external sensor module generally indicated at 32, and located beyond the pipe wall. This sensor module thus may be arranged as a separate unit, removably secured to the cylindrical element 10, i.e. readily disconnectable therefrom. Suitable fittings typically will be provided at the place where the element passes through the pipe wall, to secure the element firmly in place, and preferably to seal the opening through the pipe wall. Since such fittings are conventional, to simplify the drawings the structure is illustrated in schematic format. For the same reason, the mode of attaching the module to the cylindrical element is not shown in detail, but it will be understood that such attachment provides for proper fluid-tight seals where the conduits 26, 28 pass between the module and the cylindrical element.

Within the sensor module 32 the two conduits 26, 28 lead to opposite ends of a small fluid-tight pressure chamber 34 containing a flow-sensing or detecting device 36. In one preferred embodiment, the detecting device is a known arrangement comprising an electrically-heatable wire the ends of which are connected to external terminals 38, 40. These terminals are adapted to be coupled to a conventional sensing circuit (not shown) which produces a flow of electric current through the wire, and also measures the change in resistance of the wire resulting from displacement of the fluid accompanying the alternations in fluid pressure in the two cavities 18, 20.

This arrangement is particularly advantageous in that it maintains the detecting device 36 substantially out of contaminating contact with the flowing fluid F, and thus reduces the possibility of damage to the detector due to coating by contaminants or other adverse effect. Also, this arrangement permits ready disassembly of the principal flow meter components for purposes of checking their operation, cleaning off foreign matter which has built up on the cylindrical element, or replacing any part which is not functioning properly.

As shown in FIG. 5, the cylindrical element 10A can be secured to both opposite walls of the pipe 12, for applications where such an arrangement is appropriate.

FIGS. 6–8 show an alternate embodiment wherein the cylindrical element 10B is formed on opposite sides with elongate slots 14B, 16B to provide communication between the vortex pressure fluctuations and interior cavities 18B, 20B. The structure of element 10B is substantially greater in wall thickness than that of the FIG. 2 embodiment, and the pressure conduits 26B, 28B open out in the region of the slots 14B, 16B. It will be understood, however, that each slot provides mutual communication with both the corresponding cavity and the associated pressure conduit, so that pressure fluctuations from the shedding of vortices are transmitted to the chamber 34 as in the previously described embodiment. FIG. 9 shows an alternate construction wherein the element 10C is secured at both ends to the pipe 12.

Referring now to FIG. 10, for some applications it may be desirable to provide sealing means in the pressure conduits 26D, 28D, to effect positive isolation between the chamber 34D and the fluid flowing past the cylindrical element to which the sensor module 32D is connected. In the FIG. 10 embodiment, this is provided by use of a sealing fluid 50 which is lighter than the fluid being measured, and therefore remains up in the region of the chamber 34D so as to provide a positive seal to isolate the chamber from the fluid being measured. The conduits 26D, 28D may be formed with enlarged isolation sections 52, 54 to contain the bulk of the sealing fluid.

Other forms of sealing means can be provided to effect positive physical isolation of the fluid F from the detecting device while assuring that pressure fluctuations are transmitted from the vortices to the chamber 34 without significant attenuation. One other such arrangement is shown in FIG. 11, wherein sealing fluid 56 is provided which is heavier than the fluid F being measured. In this embodiment, the chamber 34E is located near the lower regions of the isolation sections 52, 54 so as to insure that the heavier fluid remains at all time in contact with the detection device 36. The conduits 26E, 28E are provided with vertical extensions 60, 62 which open out above the level of the fluid 56. The detection device 36 in this embodiment comprises a pressure-responsive cell, of conventional construction, adapted to produce output pulses in response to fluctuations in the pressure of the surrounding fluid.

Both of the embodiments of FIGS. 10 and 11 may be provided with shut-off valves 64, 66 to temporarily close off the pressure conduits, for example, while removing the sensor module 32 during maintenance procedures or the like. It may also be noted that a sealing fluid can be employed in the embodiments shown in FIGS. 3 and 7, e.g. in the conduit portions located in the sensor module. Similarly, shut-off valves can be included in such sensor module to close off the fluid channels while the module is disconnected from the cylindrical element 10. The shut-off valves can be made so as to operate automatically whenever the module is removed.

Although specific embodiments of the invention have been disclosed herein in detail, it is to be understood that this is for the purpose of illustrating the invention, and should not be construed as necessarily limiting the scope of the invention, since it is apparent that many changes can be made to the disclosed structures by those skilled in the art to suit particular applications.

We claim:

1. In fluid flow metering apparatus of the type wherein an elongate cylindrical element is inserted in a stream of fluid to produce at opposite sides of the element vortices which are shed in an alternating fashion with a frequency bearing a predetermined relationship to the velocity of the fluid stream, and wherein the inserted element is formed with interior cavities communicating with said fluid stream through openings at said opposite sides, said cavities being connected by an internal passageway permitting fluid to flow between said cavities and through said openings in an alternating fashion corresponding to the shedding of vortices, and wherein detection means are provided for detecting the frequency of vortex production to provide a measure of the velocity of the fluid stream;

that improvement in such apparatus which comprises:

pressure conduit means at least partly within said element connecting said cavities together through a fluid channel which is separate and distincti from said internal passageway, said fluid channel extending through a region which is remote from said cavity openings and also remote from said internal passageway, said pressure conduit means transmitting through said fluid channel to the remote region alternating fluid fluctuations produced by and corresponding in frequency to the shedding of vortices from said element;

said detection means being located in said fluid channel in the remote region of said pressure conduit means and being responsive to the fluid fluctuations therein produced by the shedding of vortices adjacent said opposite sides of said element, whereby the detection means in said remote region remains substantially free of contaminants in the fluid stream; and sealing means between said openings and said pressure conduit region to isolate said detector from said fluid while permitting transmission to the detector of the fluid fluctuations produced by the shedding of vortices.

2. Apparatus as claimed in claim 1, wherein said sealing means comprises a sealing fluid in said pressure conduits.

3. Apparatus as claimed in claim 2, wherein said detection means is located within said sealing fluid.

4. In fluid flow metering apparatus of the type wherein an elongate cylindrical element is inserted into a flow pipe carrying a stream of fluid, said element producing at opposite sides thereof vortices which are shed in an alternating fashion with a frequency bearing a predetermined relationship to the velocity of the fluid stream in the pipe, the inserted element being formed with interior cavities communicating with said flowing fluid through openings at said opposite sides, the apparatus including detection means for detecting the frequency of vortex production to provide a measure of the velocity of the fluid stream in the pipe;

the improvement in such apparatus which comprises:

pressure conduit means at least partly within said element connecting said cavities together through a region which is remote from said cavity openings, said pressure conduit means transmitting to the remote region alternating fluid fluctuations produced by and corresponding in frequency to the shedding of vortices from said element;

said detection means being located in the remote region of said pressure conduit means and being responsive to the fluid fluctuations therein produced by the shedding of vortices adjacent said opposite sides of said element; and sealing means to isolate said detection means from said openings while permitting the transmission of pressures between said openings and said detection means;

whereby the detection means in said remote region remains substantially free of contaminants in the fluid stream.

5. Apparatus as claimed in claim 4, wherein said sealing means comprises a sealing fluid in said pressure conduits.

6. Apparatus as claimed in claim 5, including valve means in said pressure conduits to provide for shutting off fluid communication between said openings and said detection means.

* * * * *